United States Patent
Kawabata et al.

(10) Patent No.: US 7,760,991 B2
(45) Date of Patent: Jul. 20, 2010

(54) MULTIMEDIA DATA REPRODUCING APPARATUS

(75) Inventors: Shunichi Kawabata, Tokyo (JP); Shinji Kuno, Tokyo (JP); Kousuke Imoji, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 41 days.

(21) Appl. No.: 12/326,808

(22) Filed: Dec. 2, 2008

(65) Prior Publication Data

US 2009/0169182 A1 Jul. 2, 2009

(30) Foreign Application Priority Data

Dec. 27, 2007 (JP) .............................. 2007-337100

(51) Int. Cl.
H04N 7/26 (2006.01)
H04N 7/00 (2006.01)
(52) U.S. Cl. ........................................ 386/124; 386/99
(58) Field of Classification Search ................. 386/124, 386/125, 45, 99, 96, 100
See application file for complete search history.

(56) References Cited

U.S. PATENT DOCUMENTS

| | | | | |
|---|---|---|---|---|
| 6,025,553 | A | * | 2/2000 | Lee .............................. 84/610 |
| 6,408,079 | B1 | * | 6/2002 | Katayama et al. ............. 381/98 |
| 2007/0116297 | A1 | * | 5/2007 | Mishra ........................ 381/77 |

FOREIGN PATENT DOCUMENTS

| | | |
|---|---|---|
| JP | 08-006553 | 1/1996 |
| JP | H10-078783 A | 3/1998 |
| JP | 11-095769 | 4/1999 |
| JP | 11-231873 | 8/1999 |
| JP | 2001-067078 | 3/2001 |
| JP | 2002-063505 | 2/2002 |
| JP | 2002-091443 | 3/2002 |
| JP | 2002-307350 | 10/2002 |
| JP | 2003-108168 | 4/2003 |
| JP | 2004-319003 | 11/2004 |
| JP | 2005-141870 | 6/2005 |
| JP | 2006-284817 | 10/2006 |

OTHER PUBLICATIONS

Notification of Reasons for Rejection issued by JPO in the corresponding to the Japanese Patent Application No. 2007-337100 on Mar. 10, 2009.

* cited by examiner

*Primary Examiner*—Robert Chevalier
(74) *Attorney, Agent, or Firm*—Knobbe, Martens Olson & Bear LLP

(57) ABSTRACT

A multimedia data reproducing apparatus includes: a multimedia data acquiring unit configured to acquire multimedia data, the multimedia data including sound data; a receiving unit configured to receive an external operating signal; a sound data processing unit configured to generate insertion audio data by using the sound data based on the external operating signal; and a multimedia data output unit configured to mix the multimedia data based on information included in the multimedia data and to insert the insertion audio data into the multimedia data for an output.

11 Claims, 11 Drawing Sheets

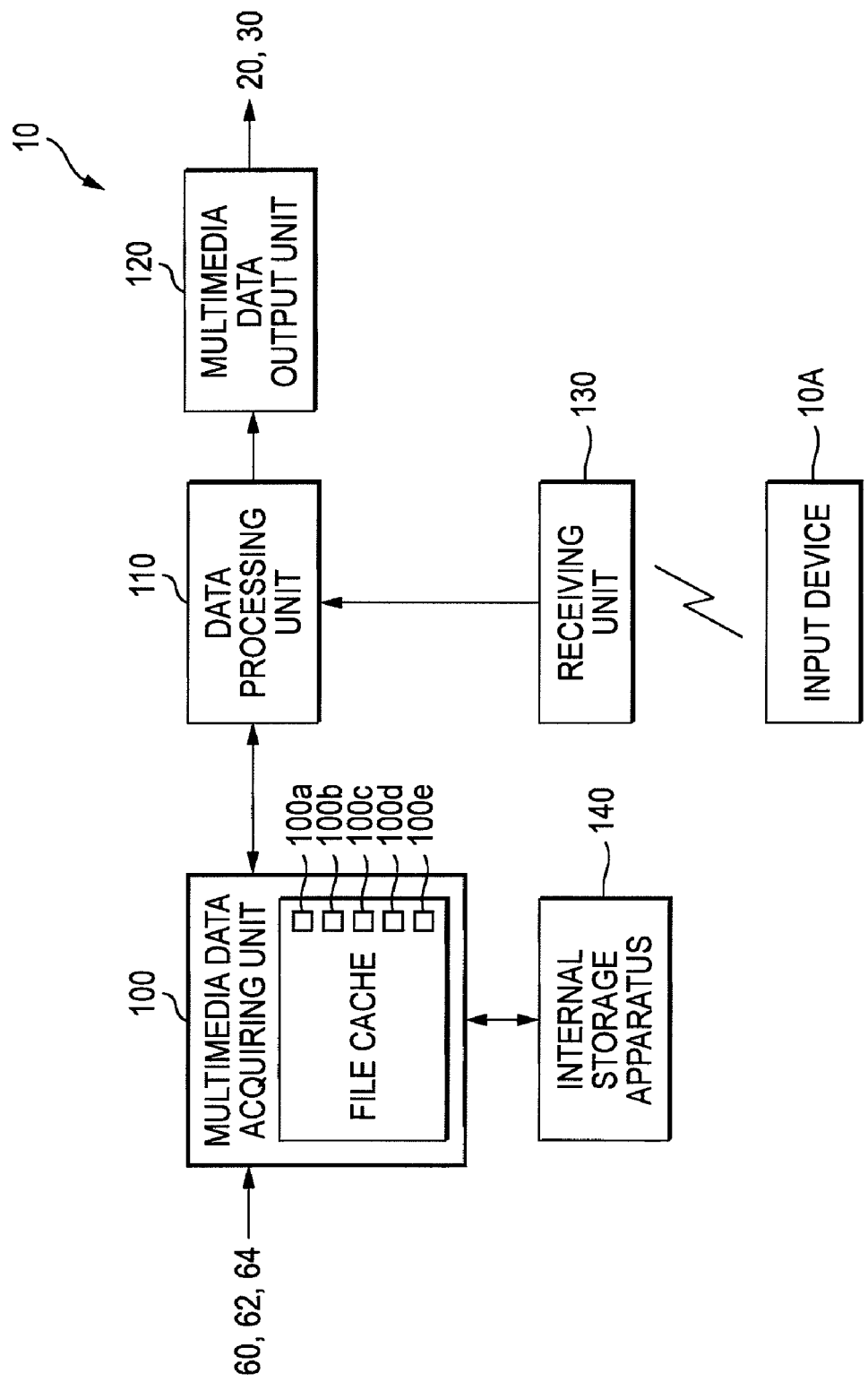

| SET NAME | DRUMS |
|---|---|
| MUTE CH | CH3 |
| EFFECT 1 | BASS DRUM |
| EFFECT 2 | SNARE |
| EFFECT 3 | CYMBAL |
| CONTROL ROBOT | ROBOT 3 |
| BUTTON 1 | EFFECT 1 |
| BUTTON 2 | EFFECT 2 |
| BUTTON 3 | EFFECT 3 |

| SET NAME | GUITAR |
|---|---|
| MUTE CH | CH6 |
| EFFECT 1 | E7 |
| EFFECT 2 | A7 |
| EFFECT 3 | E7 |
| EFFECT 4 | SOLO 1 |
| EFFECT 5 | SOLO 2 |
| BUTTON 1 | EFFECT 1 |
| BUTTON 2 | EFFECT 2 |
| BUTTON 3 | EFFECT 3 |
| BUTTON 4 | EFFECT 4 |
| BUTTON 5 | EFFECT 5 |

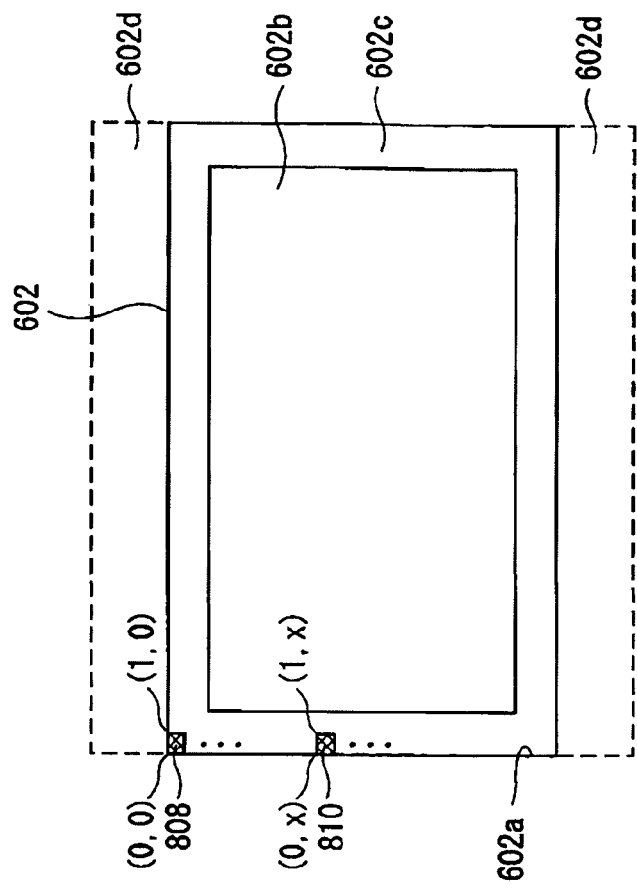

FIG. 9A

```
<object type="application/x-graphic"
style:position="absolute"
style:x="0px"
style:y="1079px"
style:height="1px"
style:width="1920px">
    <param name="width" value="1920px">
    <param name="height" value="1px">
    .
    .
    .
</object>
```

```
function(){
    for (var i=0; i< command_num; i++){
        var g= document["xxx"].drawingArea;
        var color= Drawing.createColor(r, g, b, a);
        var pen = Drawing.createPen(color, width);
        g.drawLine(pen, x1, y1, x2, y2);
    }
}
```

814

MULTIMEDIA DATA REPRODUCING APPARATUS

CROSS-REFERENCE TO RELATED APPLICATIONS

This application is based upon and claims the benefit of priority from Japanese Patent Application No. 2007-337100, filed on Dec. 27, 2007, the entire contents of which are incorporated herein by reference.

BACKGROUND

1. Field

The present invention is related to a multimedia data reproducing apparatus.

2. Description of Related Art

Hitherto, there has been known a multimedia data reproducing apparatus that has a dedicated switch for a sound effect, which is to be superposed during a play of multimedia data based on an operation of the switch (See JP-A-10-78783).

The multimedia data reproducing apparatus includes: a remote controller including a plurality of switches for remote-controlling the apparatus and a dedicated switch for a sound effect reproducing operation; a storing unit for storing plural types of sound effect data and assign information of the corresponding switching operations; and a control unit for playing multimedia data including an accompaniment and a caption for karaoke, and for simultaneously playing sound effect data based on the switching operation for the sound effect and the assign information. Consequently, the type of the sound effect becomes selectable depending on contents of the multimedia data, and furthermore, a sound effect can be reproduced in a desirable timing during the reproduction of the multimedia data.

In the conventional multimedia reproducing apparatus, however, the reproduction of the multimedia data and that of the sound effect by user's operation are independently performed, each getting through a mixing for an output. For this reason, the multimedia data and the sound effect produced by the user operation are not associated with each other, so that the reproduction of the multimedia data does not match with the user's operation.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2A is a block diagram showing an exemplified functional structure of a reproducing apparatus according to the first embodiment;

FIGS. 3A and 3B are diagrams showing an exemplified configuration of an operation table according to the first embodiment;

FIGS. 8A and 8B are views showing examples of a method of inserting apparatus control information into the multimedia data according to the second embodiment;

FIGS. 9A and 9B are diagrams showing an example of a description of a line drawing method according to the second embodiment.

DETAILED DESCRIPTION

Various embodiments according to the invention will be described hereinafter with reference to the accompanying drawings. In general, according to one embodiment of the invention, a multimedia data reproducing apparatus includes: a multimedia data acquiring unit configured to acquire multimedia data, the multimedia data including sound data; a receiving unit configured to receive an external operating signal; a sound data processing unit configured to generate insertion audio data by using the sound data based on the external operating signal; and a multimedia data output unit configured to mix the multimedia data based on information included in the multimedia data and to insert the insertion audio data into the multimedia data for an output.

Figure 1:
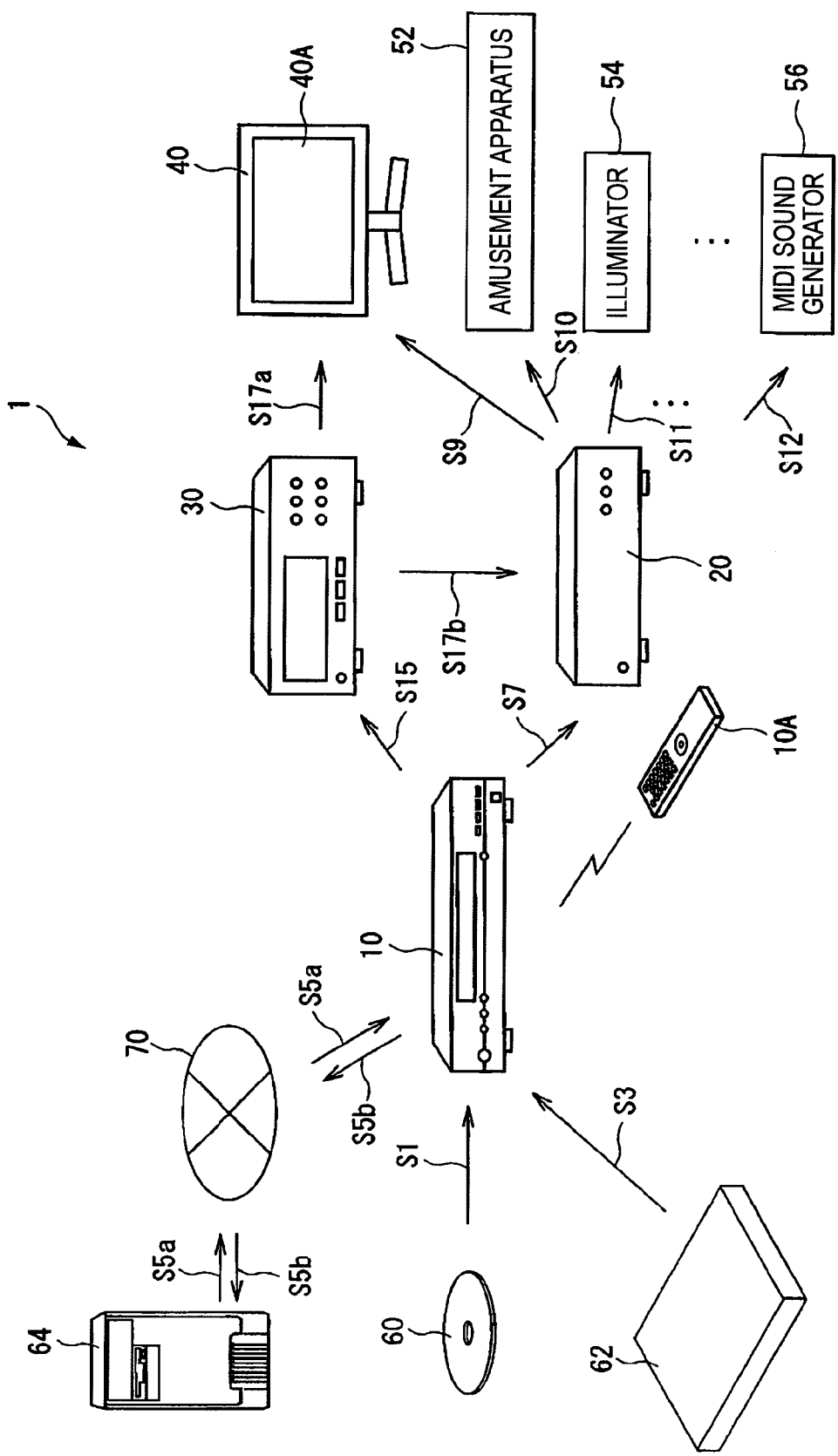
FIG. 1 is a view showing an outline of a multimedia data reproducing system according to a first embodiment.

FIG. 1 shows an outline of a multimedia data reproducing system according to a first embodiment of the invention. In FIG. 1, S1 to S17b denote data to be transferred between apparatuses.

(Outline of Multimedia Data Reproducing System 1)

A multimedia data reproducing system 1 according to the first embodiment includes a reproducing apparatus 10 (a multimedia reproducing apparatus) for acquiring multimedia data. The multimedia data includes apparatus control information and sound data in given areas thereof. The apparatus control information is for controlling operations of external apparatuses such as an amusement apparatus 52 (for example, a robot having a speaker), an illuminator 54 functioning as an illuminating apparatus, and a Music Instrument Digital Interface (MIDI) sound generator 56. The sound data is for generating an insertion audio data based on an operation of an input device 10A. The input device 10A is used for controlling the insertion audio data and the operation of the reproducing apparatus 10. The multimedia data reproducing system 1 also includes a converter 20 for extracting the apparatus control information from the multimedia data acquired by the reproducing apparatus 10 and for supplying the apparatus control information to external apparatuses; an amplifier 30 for supplying audio data in the multimedia data acquired by the reproducing apparatus 10 to a sound reproducing apparatus and/or a display apparatus 40 having the sound reproducing apparatus; and the external apparatuses such as the amusement apparatus 52, the illuminator 54 and the MIDI sound generator 56, each configured to execute given operations in accordance with the apparatus control information received from the converter 20. It is assumed that the number of speakers connected to the amplifier 30, the number of speakers provided in the amusement apparatus 52 and the number of speakers provided in the display apparatus 40 correspond to the number of audio channels output from the reproducing apparatus 10. Otherwise, it is assumed that the speakers have input terminals capable of receiving a plurality of audio channels output from the reproducing apparatus 10.

The multimedia data according to the first embodiment include graphic data, image data (motion picture data and/or still picture data), audio data (for example, data in accordance with Dolby digital Format or SPDIF Format), text data, certain control information (as an example, control information in accordance with HD DVD standards) and certain sound data (as an example, effect audio data in accordance with the HD DVD standards). Moreover, the multimedia data may include a plurality of display planes. For example, the multimedia data have a display plane for a video picture (including motion picture and still picture), a commentary display plane for picture-in-picture, a caption display plane for text data, a graphics display plane capable of including the apparatus control information, and a display plane for a cursor display.

The multimedia data are stored in a recording medium 60 acting as storage media such as optical disks, for example, CD-ROM, DVD-ROM and HD DVD, a recording medium 62 such as a magnetic recording medium or a semiconductor recording medium, for example, a removable hard disk, and/or a server 64 connected to enable a communication with the reproducing apparatus 10 through a network 70 such as Internet, LAN, WAN or a digital broadcasting network.

The reproducing apparatus 10 receives the multimedia data from the recording medium 60, the recording medium 62 or the server 64 (S1, S3, S5a). The reproducing apparatus 10 dynamically determines whether or not the apparatus control information for controlling the operation of the external apparatus is supplied from the received multimedia data to the converter 20 to enable a receipt of the apparatus control information. Then the reproducing apparatus 10 dynamically inserts the apparatus control information in the multimedia data based on a result of the determination. Moreover, it is possible to dynamically generate the apparatus control information and to insert the apparatus control information into the multimedia data in accordance with the contents of the operation of the input device 10A. Furthermore, the sound data acquired from the multimedia data are reproduced as an insertion audio data in an appropriate timing during the reproduction of the multimedia data in accordance with the operation of the input device 10A. The reproducing apparatus 10 supplies the multimedia data having the apparatus control information and the insertion audio data inserted therein to the converter 20 (S7). The reproducing apparatus 10 may supply to the amplifier 30, the sound data and the insertion audio data which are included in the multimedia data (S15).

As an example, the reproducing apparatus 10 determines whether or not the apparatus control information is supplied to the converter 20 in a readable format, in response to an instruction supplied from the input device 10A to the reproducing apparatus 10 including a user's instruction. Then, the reproducing apparatus 10 dynamically inserts the apparatus control information into the given region of the multimedia data to be supplied to the converter 20. As an example, "dynamically" may imply that the progress of the reproduction (or broadcast) of given multimedia data is not disturbed in the middle of the reproduction (or broadcast) of the multimedia data in the reproduction (or broadcast) of the multimedia data through the reproducing apparatus 10.

For example, during the reproduction of the multimedia data, the reproducing apparatus 10 switches two states without stopping and/or rewinding the multimedia data: In one state, the apparatus control information is inserted into the multimedia data readably by the converter 20; and in the other state, the apparatus control information is not inserted into the multimedia data.

The converter 20 extracts the apparatus control information from the multimedia data, and converts the extracted apparatus control information into a format that is compatible with the external apparatuses for supply (S10, S12). The external apparatus (for example, the amusement apparatus 52 such as a doll or a robot including an actuator, or the illuminator 54) executes a certain operation based on the apparatus control information thus received.

Even when the apparatus control information is not extracted, the converter 20 supplies the multimedia data to the display apparatus 40 such as an HDTV (S9). Moreover, the amplifier 30 supplies the audio data to the display apparatus 40 so that the audio data is outputted from the display apparatus 40 (S17a). The amplifier 30 may supply the audio data to the converter 20 (S17b) and the converter 20 may supply the audio data to the display apparatus 40.

The configurations and operations of the converter 20, the amusement apparatus 52, the illuminator 54 and the MIDI sound generator 56 will be described in more detail in a second embodiment.

(Structure of Reproducing Apparatus 10)

FIG. 2A shows an exemplified functional structure of the reproducing apparatus according to the first embodiment.

The reproducing apparatus 10 according to the first embodiment includes a multimedia data acquiring unit 100 configured to acquire multimedia data, a data processing unit 110 configured to carrying out a data processing over the multimedia data acquired by the multimedia data acquiring unit 100, a multimedia data output unit 120 configured to supply the multimedia data to the converter 20 and the amplifier 30, a receiving unit 130 configured to receive an operating signal sent from the input device 10A including an instruction of the user or an instruction given from external devices, and a nonvolatile internal storage apparatus 140 configured to store arbitrary data.

The multimedia data acquiring unit 100 is configured to acquire the multimedia data from the recording medium 60, the recording medium 62 or the server 64. The recording medium 60 may be an optical disk recording medium in accordance with the HD DVD standards. In this case, the multimedia data also have a data structure in accordance with the HD DVD standards. The multimedia data acquiring unit 100 supplies the acquired multimedia data to the data processing unit 110. Moreover, the multimedia data acquiring unit 100 has a file cache 100A for temporarily storing data. The file cache 100A stores an effect audio 100a as sound data, a markup file 100b and a script file 100c as apparatus control information, an operation table 100d and a playing table 100e. The operation table 100d and the playing table 100e will be described below.

The multimedia data according to the embodiment may include an external apparatus ID which is an external apparatus identifier for uniquely identifying the external apparatus. The apparatus controlling information for controlling the external apparatus identified by the external apparatus ID may be included in a displaying data area by the data processing unit 110 that executes the markup file 100b and the script file 100c. The apparatus control information indicates information for controlling the amusement apparatus 52 such as a robot to execute a certain operation in a given timing, information for controlling the illuminator 54 to execute a certain operation such as flashing in a given timing, and information for controlling the MIDI sound generator 56 to execute an operation for outputting a certain sound at a given timing. The apparatus control information may be recorded as an audio signal (for example, signals in the format of Dolby digital or SPDIF) in the multimedia data.

The data processing unit 110 carries out a decode processing over the multimedia data received from the multimedia data acquiring unit 100. Then, the data processing unit 110 reproduces audio data of the decoded multimedia data, and reproduces the insertion audio data, based on an inserting instruction command from the receiving unit 130, and the effect audio 100a.

The data processing unit 110 superposes a plurality of display planes in video data of the decoded multimedia data and executes the markup file 100b and the script file 100c, thereby inserting the apparatus control information dynamically into the displaying data area. The data processing unit 110 may dynamically call the markup file 100b and the script file 100c which are included in the multimedia data in advance, thereby generating the apparatus control information based on a generating instruction input from the receiving unit 130.

As an example, the data processing unit 110 inserts the apparatus control information into a lowermost side or a leftmost side of the displaying data area of the multimedia data. The apparatus control information may be dynamically generated synchronously with a title time line and inserted into the displaying data area.

The data processing unit 110 supplies, to the multimedia data output unit 120, audio data including the insertion audio data and video data including the apparatus control information.

When the audio data of the multimedia data have a plurality of channels, the multimedia data output unit 120 adjusts a volume balance of each of the channels and insert the insertion audio data into an appropriate channel. Then, the multimedia data are supplied along with the video data including the apparatus control information to the converter 20 and/or the amplifier 30.

The receiving unit 130 receives an operating signal based on the operation of the input device 10A and outputs an instruction for inserting the sound data, an instruction for inserting the apparatus control information and an instruction for generating the apparatus control information to the data processing unit 110.

The internal storage apparatus 140 may be a nonvolatile mass storage apparatus such as a Hard Disk Drive (HDD), which is configured to store arbitrary data.

The multimedia data includes a plurality of contents data (for example, music data, video data and caption data) for respective titles. The title time line indicates a common time unit for all of the contents data specified by a time (for example, every 1/60 second) after a start of the reproduction of the multimedia data including the contents data. The title time line is determined by utilizing a time provided by a reference timer in the apparatus, for example. The timer is set into a certain time when the reproduction of the multimedia data is re-started in response to an operation such as a rewind, a fast-forward and/or a skip for the multimedia data.

As an example, the reproducing apparatus 10 according to the embodiment may be an HD DVD player in accordance with the HD DVD standards. The reproducing apparatus 10 may include a recording medium reproducing apparatus such as a CD-ROM player, a DVD-ROM player or a digital video player in addition to the HD DVD player or a portable information terminal such as a home-use game machine, a cellular phone terminal or a Personal Digital Assistance (PDA).

Figure 2B:
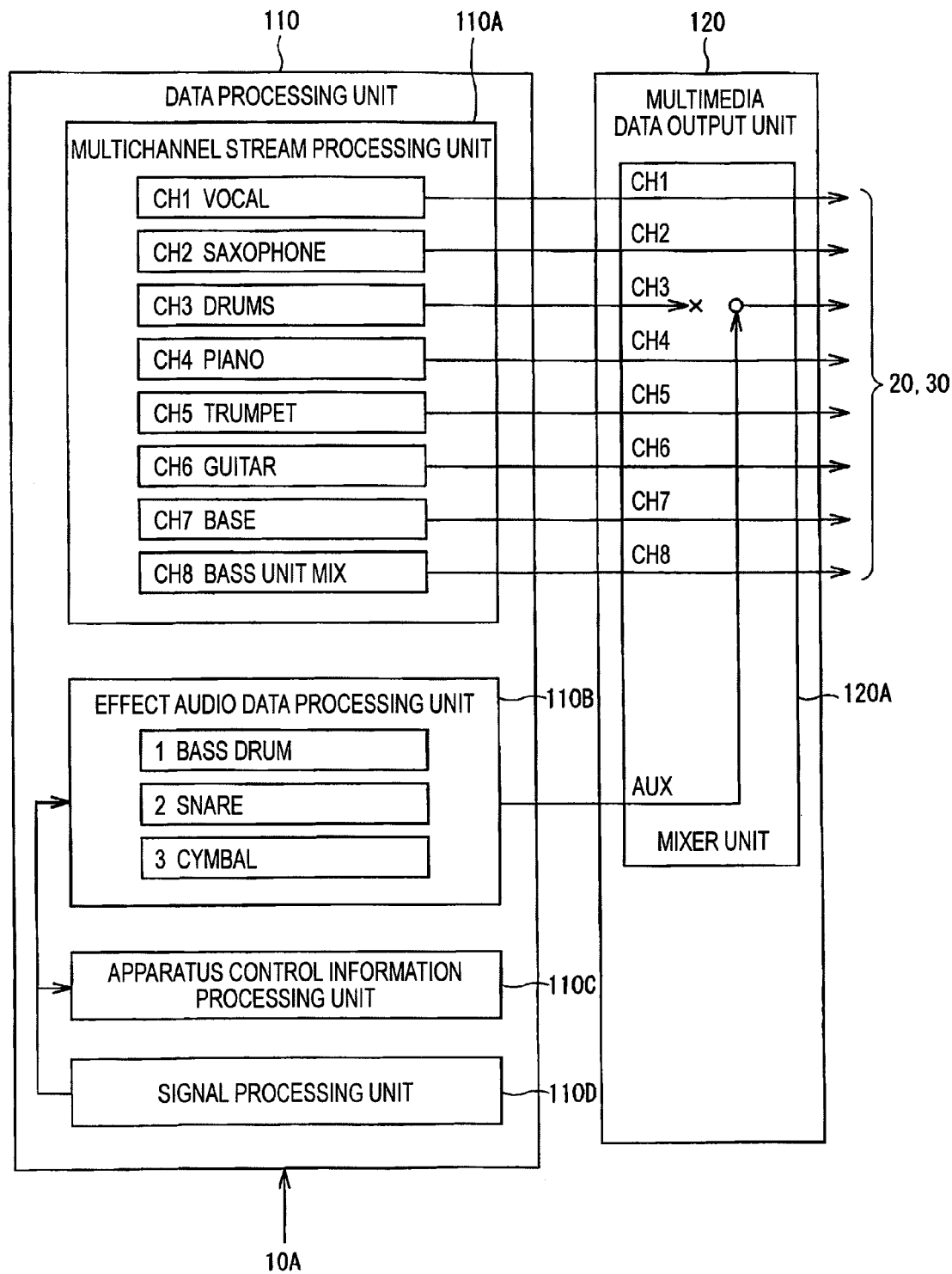
FIG. 2B is a block diagram showing a detailed example of the functional structure of the reproducing apparatus according to the first embodiment.

FIG. 2B shows a detailed example of the functional structure of the reproducing apparatus according to the first embodiment of the invention.

The data processing unit 110 includes a multichannel stream processing unit 110A for separating audio data into a plurality of channels to carry out a reproduction, an effect audio data processing unit 110B for reproducing the effect audio 100a acquired from the multimedia data based on the inserting instruction input from the receiving unit 130, an apparatus control information processing unit 110C for calling the markup file 100b and the script file 100c to generate apparatus control information based on the generating instruction input from the receiving unit 130, and a signal processing unit 110D for inputting, to each unit, the instruction input from the receiving unit 130.

The multimedia data output unit 120 has a mixer unit 120A for controlling a volume of the audio data received from the multichannel stream processing unit 110A with respect to each channel and for inserting the insertion audio data received from the effect audio data processing unit 110B into a certain channel in a multichannel stream. As an example, audio data of "Ch3" are muted and audio data of the effect audio are inserted.

FIGS. 3A and 3B show exemplified configurations of an operation table according to the first embodiment of the invention.

As an example, the operation table 100d has "mute Ch" for specifying a channel to be muted in the mixer unit 120A, "effect 1" to "effect 3" for specifying the effect audio read from the effect audio 100a of the file cache 100A by the effect audio data processing unit 110B, "control robot" for enabling the apparatus control information processing unit 110C to control a robot 3 of the amusement apparatus 52 in conformity to the contents of the operation of the input device 10A, and "button 1" to "button 3" for enabling the operations of switches in the input device 10A to correspond to the operations of the effect audio data processing unit 110B.

As another example, the operation table 100d may have "mute Ch" for specifying a channel to be muted in the mixer unit 120A, "effect 1" to "effect 5" for specifying the effect audio read from the effect audio 100a in the file cache 100A by the effect audio data processing unit 110B, "control MIDI" for enabling the apparatus control information processing unit 110C to control the MIDI sound generator 56 in conformity to the contents of the operation of the input device 10A, and "button 1" to "button 5" for enabling the operations of the switches in the input device 10A to correspond to the operations of the effect audio data processing unit 10B.

Figure 4:
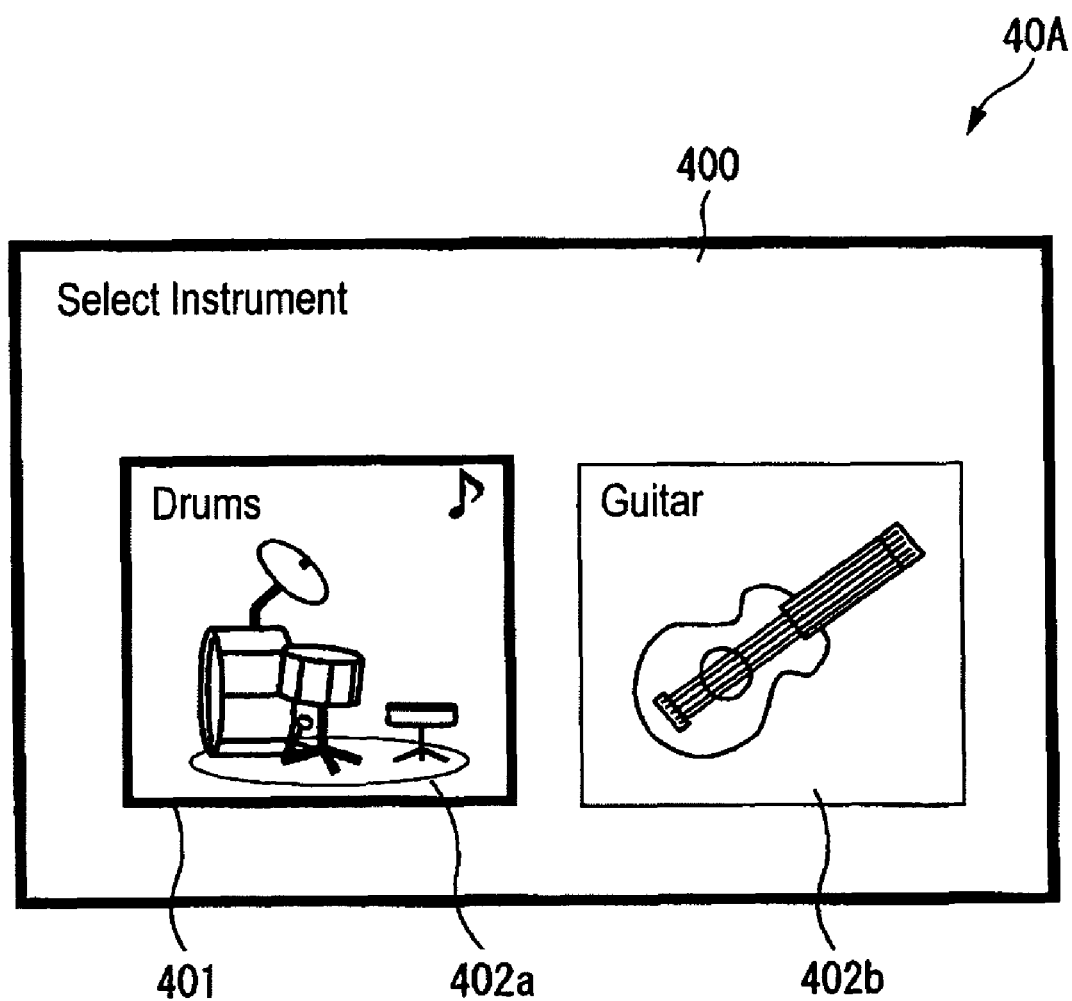
FIG. 4 is a view showing an example of a screen display of the reproducing apparatus according to the first embodiment.

FIG. 4 shows an example of a screen display of the reproducing apparatus according to the first embodiment of the invention.

An instrument selecting menu 400 is displayed on a display screen 40A by operating a corresponding switch of the input device 10A, and has instruments 402a and 402b for selecting an instrument which can be played by a user, and a selecting frame 401 for selecting the instrument 402a or 402b. For example, the instrument 402a of "drums" may be selected to operate the input device 10A so that a sound of the drum is output and a doll of a drummer in the amusement apparatus 52 is manipulated.

Figure 5:
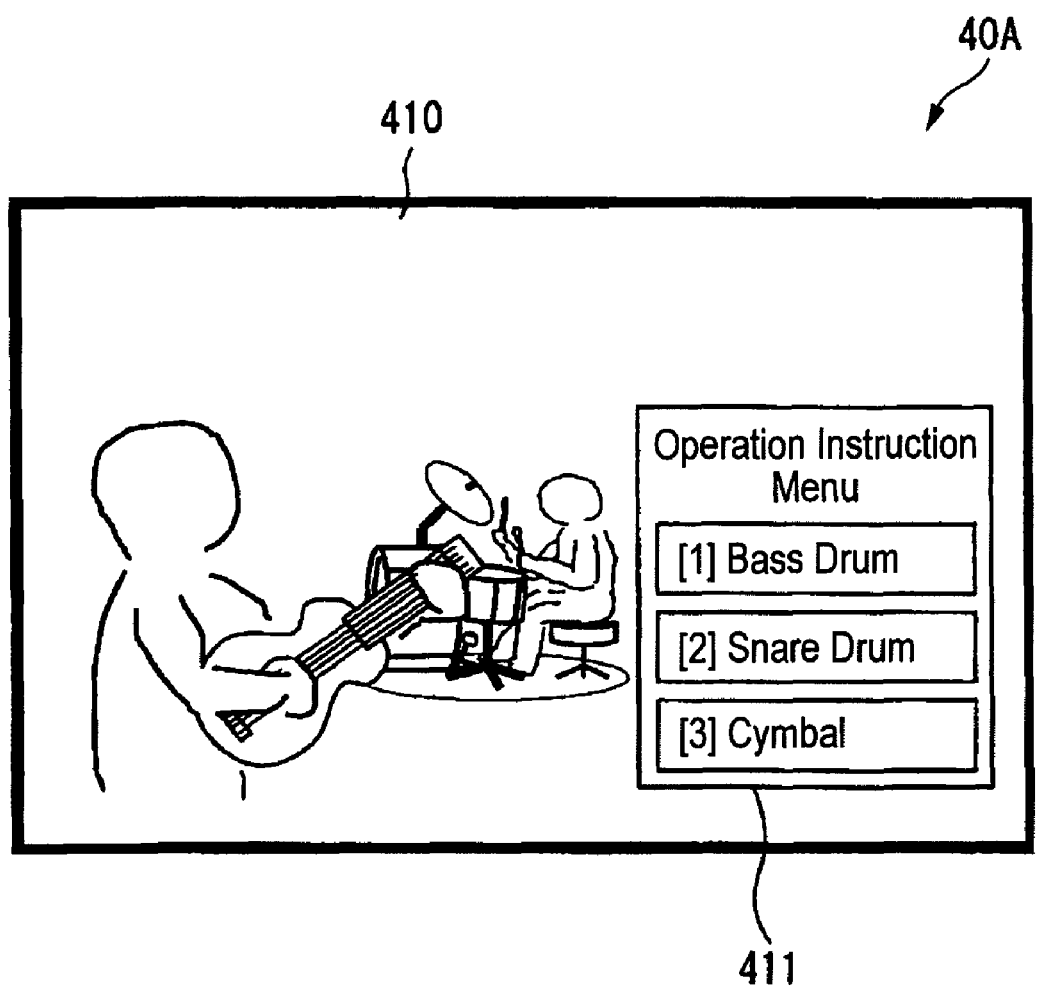
FIG. 5 is a view showing an example of the screen display of the reproducing apparatus according to the first embodiment.

FIG. 5 shows an example of the screen display of the reproducing apparatus according to the first embodiment of the invention.

An operation explanation menu is displayed on the display screen 40A when the instrument 402a is selected in the screen shown in FIG. 4 and the multimedia data proceeds to be played. The operation explanation menu includes a multimedia video 410 for displaying the contents of the multimedia data and an operation instruction menu 411 for explaining a correspondence of the switch provided in the input device 10A to an inserting sound.

(Operation)

The operation according to the first embodiment of the invention will be described below with reference to the drawings.

When a certain switch, for example, an "instrument play" switch (not shown) provided in the input device 10A is operated, the instrument selecting menu 400 shown in FIG. 4 is displayed.

Next, a desirable instrument, for example, the "drums" instrument 402a is selected by a user through the selecting frame 401 so that the data processing unit 110 acquires a table for the set name "drums" in the operation table 100d shown in FIG. 3A or 3B and the effect audio data processing unit 110B acquires the effect audio of "bass drum", "snare" and "cymbal" from the effect audio 100a in accordance with the table. Moreover, the signal processing unit 110D relates the operations of "button 1" to "button 3" of the input device 10A to "effect 1" to "effect 3" of the effect audio data processing unit 110B.

Moreover, the multimedia data output unit 120 mutes the channel "Ch3" of the mixer unit 120A in accordance with the operation table 100d and sets an input from the effect audio data processing unit 110B so as to be output from the "Ch3".

Subsequently, a reproducing button (not shown) of the input device 10A is operated by the user so that the reproduction of the multimedia data is started. The multimedia data acquiring unit 100 starts to acquire the multimedia data from the recording medium 60, the recording medium 62 or the server 64 and to input, to the data processing unit 110, video data and audio data as stream data. Moreover, the multimedia data acquiring unit 100 temporarily stores, in the file cache 100A, the effect audio, the markup file, the script file and the operation table which are included in the multimedia data.

The data processing unit 110 carries out a processing to decode the video data and the audio data in the multimedia data and to output the same data from the multimedia data output unit 120, and furthermore, processes the markup file 100b and the script file 100c synchronously with a predetermined title time and inserts an apparatus control signal into the video data.

When the operations are executed, the multimedia video 410 shown in FIG. 5 is displayed on the display screen 40A and sound related to the audio data in the multimedia data is output from the display apparatus 40, the amusement apparatus 52 or the amplifier 30.

Next, an operating signal is input to the receiving unit 130 with the operation of the input device 10A through the user and is then input to the data processing unit 110. Corresponding to the operation of "button 1" to "button 3" through the input device 10A, the signal processing unit 110D operates the effect audio data processing unit 110B to reproduce the sounds of "bass drum", "snare" and "cymbal".

Advantage of First Embodiment

According to the multimedia data reproducing system 1 in accordance with the first embodiment, it is possible to link the method of reproducing the multimedia data corresponding to the user operation of the input device 10A. For example, when the contents of the multimedia data during the reproduction are a band performance, the contents data is reproduced while muting an audio output of a part desired by the user and the effect audio of the part desired by the user can be output as an audio based on the operation of the input device 10A.

Second Embodiment (Configuration of Converter 20)

Figure 6:
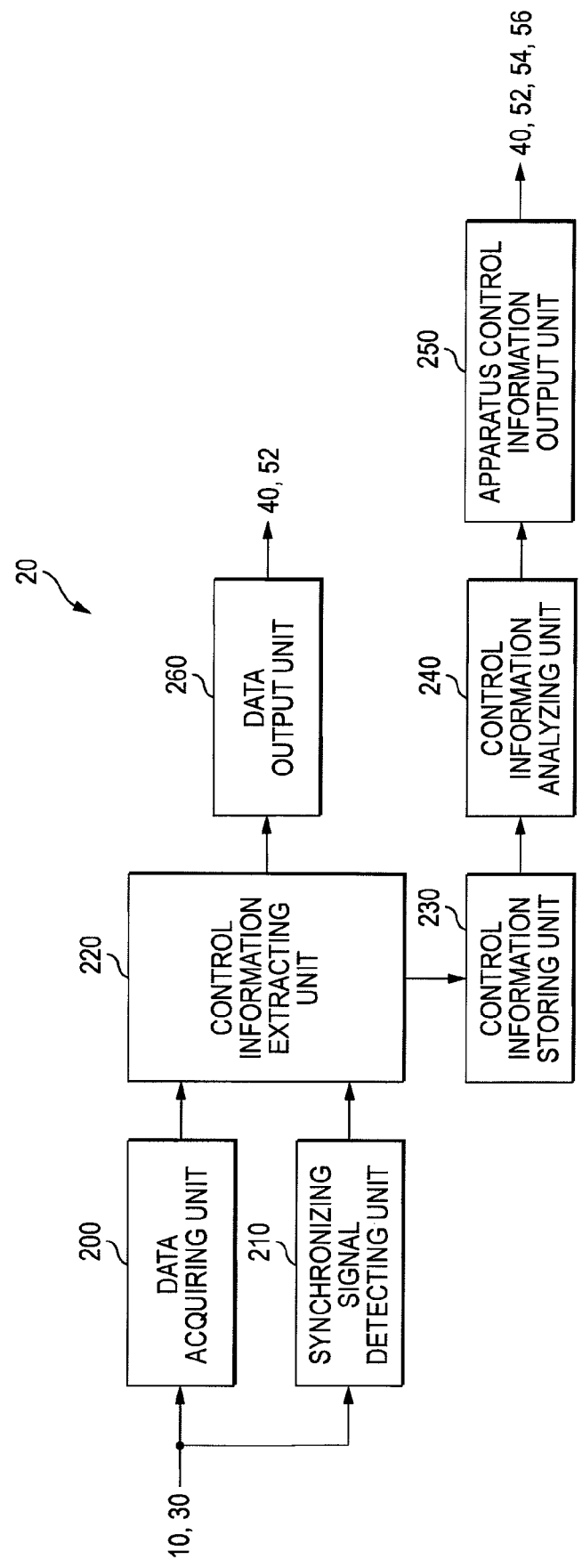
FIG. 6 is a block diagram showing an exemplified functional structure of a converter according to a second embodiment.

FIG. 6 shows an exemplified functional configuration of a converter according to a second embodiment of the invention. In the following description, portions having the same structures and functions as those in the first embodiment are denoted by common references.

A converter 20 according to the second embodiment includes: a data acquiring unit 200 for acquiring multimedia data including apparatus control information; a synchronizing signal detecting unit 210 for detecting a synchronizing signal; a control information extracting unit 220 for extracting the apparatus control information from the multimedia data based on the synchronizing signal; a control information storing unit 230 for storing the apparatus control information extracted by the control information extracting unit 220; a control information analyzing unit 240 for analyzing the apparatus control information stored in the control information storing unit 230; an apparatus control information output unit 250 for outputting the apparatus control information to external apparatuses corresponding to external apparatus identifiers in the apparatus control information depending on a result of the analysis of the control information analyzing unit 240; and a data output unit 260 for outputting the multimedia data to a display apparatus 40 and/or an amusement apparatus 52.

The data acquiring unit 200 acquires the multimedia data including the apparatus control information output from a multimedia data output unit 120 of a reproducing apparatus 10. Then, the data acquiring unit 200 supplies the multimedia data thus acquired to the control information extracting unit 220.

The synchronizing signal detecting unit 210 detects the presence of a synchronizing signal sent from a component input terminal (not shown). As an example, the synchronizing signal detecting unit 210 detects a horizontal synchronizing signal displaying a lowermost side of the multimedia data. The synchronizing signal detecting unit 210 may detect the synchronizing signal based on a luminance component of a component video signal or an HDMI video signal. When an output resolution is an SD resolution, furthermore, the synchronizing signal detecting unit 210 may detect the synchronizing signal based on a composite video signal. The synchronizing signal detecting unit 210 supplies the synchronizing signal thus detected to the control information extracting unit 220.

The control information extracting unit 220 extracts the apparatus control information included in a given region of the multimedia data based on the synchronizing signal received from the synchronizing signal detecting unit 210. As an example, the control information extracting unit 220 extracts the apparatus control information in response to the horizontal synchronizing signal. The apparatus control information is extracted by setting a threshold for a luminance value, for example. A bright (On) or dark (Off) signal is extracted per pixel in a horizontal direction. In other words, one pixel serves as one bit and apparatus control information of 1920 bits can be extracted in one frame in a maximum of 1920 pixels×1 bit when a video signal has a resolution of 1920×1080.

Moreover, the control information extracting unit 220 can also replace a displaying data area including the apparatus control information with monochromatic data (for example, a white or black color or a maximum or minimum luminance component) after extracting the apparatus control information from the multimedia data. When the multimedia data are underscanned, consequently, it is possible to reduce a flicker of the multimedia data displayed on the display apparatus 40. When the multimedia data are not underscanned, the control information extracting unit 220 can also supply the multimedia data to the data output unit 260 without replacing the displaying data area with the monochromatic data.

The control information extracting unit 220 may extract a luminance or a color in a part of the displaying data area in which the apparatus control information is included or on a scan line within a certain range from the same region, thereby replacing, with the monochromatic data or the extracted color, the displaying data area including the apparatus control information by using the extracted luminance or color. The control information extracting unit 220 supplies, to the data output unit 260, the multimedia data subjected to a predetermined processing or the multimedia data which have not been subjected to the given processing. The control information extracting unit 220 stores the apparatus control information in the control information storing unit 230 corresponding to an external apparatus ID of an external apparatus to be a control target of the extracted apparatus control information.

The control information storing unit 230 stores the apparatus control information corresponding to the external apparatus ID. The control information analyzing unit 240 analyzes the apparatus control information stored in the control information storing unit 230 and supplies the same apparatus control information to the apparatus control information output unit 250. More specifically, the control information analyzing unit 240 analyzes the control information and identifies the external apparatus (for example, the display apparatus 40, the amusement apparatus 52 or an illuminator 54) identified with the external apparatus ID corresponding to the apparatus control information, and furthermore, acquires the apparatus control information stored in the control information storing unit 230 corresponding to the external apparatus ID. The control information analyzing unit 240 outputs the acquired apparatus control information from the apparatus control information output unit 250 to the external apparatus identified with the external apparatus ID. The apparatus control information output unit 250 outputs the apparatus control information to each of the external apparatuses.

The apparatus control information output unit 250 functions as a DMX signal output unit for outputting an illumination controlling signal. More specifically, the multimedia data include a DMX signal as apparatus control information for controlling the operation of the illuminator 54. The DMX signal includes a dimming output signal of the illuminator 54, for example. In this case, the apparatus control information output unit 250 outputs apparatus control information to each of the external apparatuses corresponding to each of the external apparatus IDs. For example, the apparatus control information output unit 250 outputs apparatus control information for an amusement apparatus to the amusement apparatus 52 such as a robot, and at the same time, outputs the DMX signal to the illuminator 54.

Moreover, a multimedia data reproducing system 1 includes, as an external apparatus, a MIDI sound generator 56 such as an electronic musical instrument in accordance with the MIDI standards. In this case, the multimedia data include apparatus control information for controlling an operation of the electronic musical instrument. In this case, the apparatus control information output unit 250 functions as a MIDI signal output unit.

The data output unit 260 outputs the multimedia data to the display apparatus 40 and/or the amusement apparatus 52. The display apparatus 40 outputs the multimedia data to a user visibly and/or audibly. Moreover, the amusement apparatus 52 includes a sound generating unit (for example, a speaker) and outputs sound data included in the received multimedia data to the user audibly.

(Example of Multimedia Data)

Figure 7:
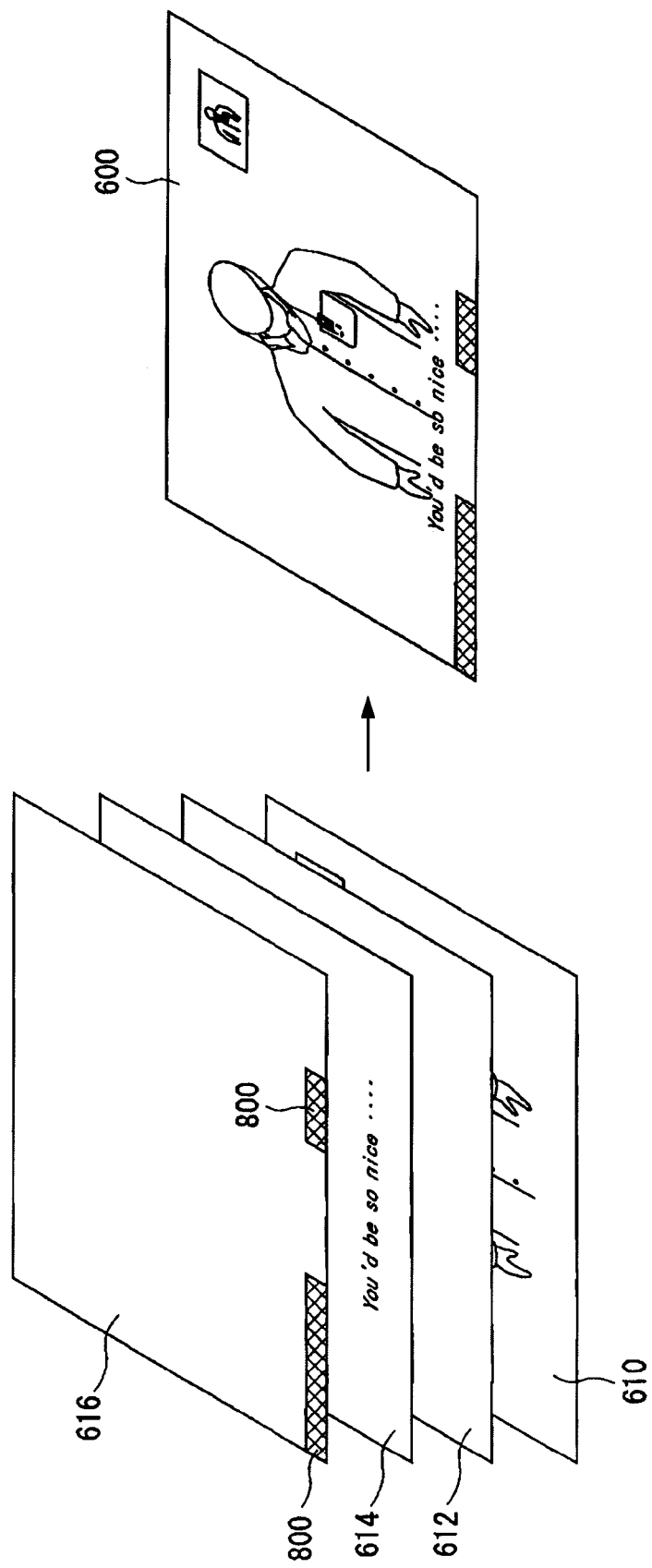
FIG. 7 is a view showing an example of a structure of multimedia data according to the second embodiment.

FIG. 7 shows an example of a structure of the multimedia data according to the second embodiment of the invention.

The multimedia data according to the second embodiment are video data corresponding to the HD DVD standards, for example. As an example, the multimedia data to be the video data have a display plane 610 for a video image (including dynamic image data and sound data), a commentary display plane 612 for picture-in-picture, a caption display plane 614 for text data, a graphics display plane 616 capable of including apparatus control information (for example, apparatus control information 800), and a display plane (not shown) for a cursor display. More specifically, an image 600 according to the embodiment is video data corresponding to advanced contents.

A data processing unit 110 of the reproducing apparatus 10 superposes the display plane 610, the display plane 612, the display plane 614 and the display plane 616 to be metadata respectively, thereby generating the image 600. Then, the data processing unit 110 dynamically inserts the apparatus control information to the image 600. As an example, the data processing unit 110 draws the apparatus control signal 800 on the display plane 616 through a predetermined program processing so that the apparatus control information can be inserted on a frame unit.

In the embodiment, accordingly, the data processing unit 110 can dynamically insert the apparatus control information into the multimedia data by utilizing the metadata. Therefore, even when an interface of the converter 20 for transferring the multimedia data is not compatible with the HD DVD standards, the converter 20 can also define a data transfer of the multimedia data. Moreover, the data processing unit 110 dynamically inserts output enable/disable information into the multimedia data by utilizing the metadata. Even when the converter 20 synchronously controls a plurality of external apparatuses, it is not necessary to consider the limitation in the maximum number of channels as in a MIDI cable. Accordingly, a simultaneous control can easily be implemented.

(Detail of Insertion of Apparatus Control Information)

FIG. 8 shows an example of a method of inserting the apparatus control information into the multimedia data according to the second embodiment of the invention.

The image 600 as the multimedia data includes a region 600b on which an image is actually displayed, a region 600c on which an image is displayed when an underscan is carried out, and a region 600d in which write of information is restricted based on the HD DVD standards, for example. As an example, the regions 600b and 600c are defined as displaying data areas. The apparatus control information is previously recorded on a lowermost side 600a of the region 600d.

For example, the data processing unit 110 draws lines having certain lengths (for example, lines 800, 802, 804 and 806) indicative of the apparatus control information on in the lowermost side 600a in the image 600, which is a lowermost line (for example, a 1080th line from an upper end), thereby inserting the apparatus control information dynamically into the image 600.

Referring to FIG. 8B, which is another example of the embodiment, the data processing unit 110 can also insert the apparatus control information into the image 600 by drawing lines 808 and 810 having lengths corresponding to one pixel on a left end 602a of an image 602.

In the embodiment, the data processing unit 110 can determine the execution of the operation of the external apparatus by using a graphics drawing function in the HD DVD standards and Drawing API or a markup language, for example. Therefore, it is possible to easily synchronize contents to be the multimedia data for HD DVD with the external apparatus.

(Description of Line Drawing Method)

FIGS. 9A and 9b show an example of a description of a line drawing method according to the second embodiment of the invention.

The data processing unit 110 draws a line on the image 600 or 602 as shown in FIGS. 8A and 8B based on a markup file 812 shown in FIG. 9A or a script file 814 shown in FIG. 9B. When the reproducing apparatus 10 further has a certain graphic engine, the data processing unit 110 may share load of the line drawing operation with the graphic engine. Since the apparatus control information can be included in the multimedia data by using the markup file or the script file which is defined based on the HD DVD standards, a contents creator can easily edit the apparatus control information and can make up, in a short time, linking contents data between the multimedia data and the external apparatus.

The data processing unit 110 can select whether or not the line is drawn on the image 600 or 602 based on the contents of the operation of an input device 10A. The data processing unit 110 may embed information about whether the apparatus control information is directly output to the multimedia data without using the markup file 812 or the script file 814.

(Operation)

An operation according to the second embodiment of the invention will be described below with reference to each of the drawings.

In an instrument selecting menu 400 in FIG. 4, a desirable instrument, for example, a "drums" instrument 402a is selected through a selecting frame 401 so that the data processing unit 110 acquires a table for the set name "drums" in an operation table 100d shown in FIG. 3 and an effect audio data processing unit 110B acquires effect audios of "bass drum", "snare" and "cymbal" from an effect audio 100a in accordance with the table. Moreover, an apparatus control information processing unit 110C causes a robot 3 of the amusement apparatus 52 to correspond to the operation of the input device 10A in accordance with the table. Furthermore, a signal processing unit 110D causes the operations of "button 1" to "button 3" of the input device 10A to correspond to "effect 1" to "effect 3" of the effect audio data processing unit 110B respectively.

Moreover, the multimedia data output unit 120 mutes a channel "Ch3" of a mixer unit 120A in accordance with the operation table 100d and sets an input from the effect audio data processing unit 110B so as to be output from the "Ch3".

Subsequently, a reproducing button (not shown) of the input device 10A is operated by the user so that the reproduction of the multimedia data is started and a multimedia data acquiring unit 100 acquires the multimedia data from a recording medium 60, a recording medium 62 or a server 64 and inputs, to the data processing unit 110, video data and audio data which are stream data, thereby starting a processing. Moreover, the multimedia data acquiring unit 100 temporarily stores, in a file cache 100A, the effect audio, the markup file, the script file and the operation table which are included in the multimedia data.

The data processing unit 110 carries out a processing to decode the video data and the audio data in the multimedia data and to output the same data from the multimedia data output unit 120, and furthermore, processes a markup file 100b and a script file 100c synchronously with a given title time and inserts an apparatus control signal into the video data.

When the operations are executed, a multimedia video 410 shown in FIG. 5 is displayed on a display screen 40A and a voice related to the audio data in the multimedia data is output from the display apparatus 40, the amusement apparatus 52 or an amplifier 30.

Next, an operating signal is input to a receiving unit 130 with the contents of the operation of the input device 10A through the user and is then input to the data processing unit 110. Corresponding to the operation of "button 1" to "button 3" through the input device 10A, the signal processing unit 110D operates the effect audio data processing unit 110B to reproduce "bass drum", "snare" and "cymbal", and furthermore, the apparatus control information processing unit 110C is operated to dynamically call the markup file and the script file, thereby generating the apparatus control information dynamically. Thus, the apparatus control information is inserted into the video data.

Advantage of Second Embodiment

According to the second embodiment, when the contents of the multimedia data being reproduced are the band performance, only an audio output of a part desired by the user can be muted during the reproduction of the contents data. Moreover, only an operation of the part desired by the user, for example, one part of the amusement apparatus 52 operated based on the apparatus control information in the multimedia data such as a doll for playing the instrument, can be stopped while operating the other parts. Furthermore, an effect audio of the part desired by the user can be output as an audio based on the manipulation of the input device 10A while operating the doll corresponding to the part based on the manipulation. The MIDI sound generator 56 may be operated simultaneously with the operation of the doll. In this case, it is also possible to output a voice without using the effect audio.

Third Embodiment

Figure 10:
FIG. 10 is a diagram showing an exemplified configuration of a playing table according to a third embodiment.

FIG. 10 shows an example of a structure of a playing table according to a third embodiment of the invention.

As an example, a playing table 100e has a performance title describing a title of multimedia data played by a user and a track title, a time line as a history of an operation of the user, effect audio operation information indicative of contents of the operation of the user with respect to an effect audio, and apparatus control information indicative of contents of the operation by the user with respect to an apparatus control information apparatus.

(Operation)

An operation according to the third embodiment of the invention will be described below with reference to each of the drawings.

A data processing unit 110 stores an operating signal to be input to a receiving unit 130 through an operation of an input device 10A by a user. For example, during a musical performance of the user, a signal processing unit 110D instructs an effect audio data processing unit 110B to reproduce "bass drum", "snare" and "cymbal" corresponding to a manipulation of "button 1" to "button 3" of the input device 10A and to write the operation information in the playing table 100e. In response to the manipulation of the "button 1" to "button 3" of the input device 10A, an apparatus control information processing unit 110C is operated to dynamically generate a markup file and a script file, thereby inserting apparatus control information into video data and writing, in the playing table 100e, operation information for inserting the apparatus control information.

When a reproduction of the title is finalized, the data processing unit 110 stores the playing table 100e in a file cache 10A. When the use of a reproducing apparatus 10 is finished, moreover, the playing table 100e is stored in an internal storage apparatus 140 from the file cache 100A.

The playing table 100e stored in the file cache 100A or the internal storage apparatus 140 may be read through an operation of a user so that the playing table 100e thus read is reproduced together with corresponding multimedia data in the data processing unit 110. In other words, it is possible to reproduce what is operated on the input device 10A by the user.

Advantage of Third Embodiment

According to the third embodiment, when the contents of the multimedia data being reproduced are a band performance, an effect audio of a part desired by the user can be output as an audio based on the operation of the input device 10A and a doll of the part desired by the user can be operated based on the operation. Furthermore, the contents of the operation can be stored as the playing table 100e and the contents of the operation can be reproduced by using the playing table 100e.

Moreover, since the playing table 100e is information for giving an instruction for reproducing the effect audio and for generating an apparatus control signal, it is not necessary to ensure a storage capacity for recording an actual effect audio or for recording an apparatus control signal.

Other Embodiment

According to other embodiments, a playing table 100e may be uploaded and stored in the server 64 through a communication with the server 64 through a network 70 by the multimedia data acquiring unit 100. The playing table 100e stored in the server 64 may be reproduced together with multimedia data having the same contents. Therefore, it is possible to reproduce the contents of a performance by using another reproducing apparatus. Moreover, it is also possible to employ a configuration in which the playing table 100e is uploaded into the server 64 shown in FIG. 1 through streaming simultaneously with the performance of a user (S5b). Thus, it is possible to carry out a remote control by performing the streaming over another reproducing apparatus to which the multimedia data having the same contents are set. Since the contents of the operation are synchronized with a time line, there occurs no delay from the reproduction of the multimedia data is not generated. The contents described above are illustrative and the operation of the user is not limited to the musical performance.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A multimedia data reproducing apparatus comprising:
a multimedia data acquiring portion that acquires multimedia data including sound source data for insertion previously;
a receiving portion that receives an operating signal sent from an outside;
an inserting sound source data processing portion that reproduces sound source for insertion by reproducing the sound source data for insertion based on the operating signal received by the receiving portion; and
a multimedia data output portion that reproduces a plurality of audio data included in the multimedia data to adjust volumes thereof based on the sound source data for insertion to be reproduced and that outputs the sound source for insertion to be reproduced so that the sound source for insertion is inserted into the plurality of audio data.

2. A multimedia data reproducing apparatus comprising:
a multimedia data acquiring portion that acquires multimedia data including sound source data for insertion previously;
a receiving portion that receives an operating signal sent from an outside;
an inserting sound source data processing portion that reproduces sound source for insertion by reproducing the sound source data for insertion based on the operating signal;
an apparatus control information processing portion that generates apparatus control information for controlling an outside apparatus based on the operating signal and that inserts the apparatus control information into the multimedia data; and
a multimedia data output portion that reproduces a plurality of audio data included in the multimedia data to adjust volumes thereof based on the sound source data for insertion to be reproduced and that outputs the sound source for insertion to be reproduced so that the sound source for insertion is inserted into the plurality of audio data.

3. The multimedia data reproducing apparatus according to claim 1, wherein the inserting sound source data processing portion stores an input history of the operating signal and the sound source data for insertion which has been reproduced, so as to be associated with a title time of the multimedia data.

4. The multimedia data reproducing apparatus according to claim 2, wherein the inserting sound source data processing portion stores an input history of the operating signal and the sound source data for insertion which has been reproduced, so as to be associated with a title time of the multimedia data.

5. The multimedia data reproducing apparatus according to claim 2, wherein the apparatus control information processing portion stores the apparatus control information generated based on the operating signal, so as to be associated with a title time of the multimedia data.

6. The multimedia data reproducing apparatus according to claim 3, wherein the inserting sound source data processing portion reads the stored input history of the operating signal and the reproduced sound source data for insertion and reproduce the stored input history of the operating signal and the reproduced sound source data for insertion along with the multimedia data in accordance with the title time.

7. The multimedia data reproducing apparatus according to claim 4, wherein the inserting sound source data processing portion reads the stored input history of the operating signal and the reproduced sound source data for insertion and reproduce the stored input history of the operating signal and the reproduced sound source data for insertion along with the multimedia data in accordance with the title time.

8. The multimedia data reproducing apparatus according to claim 5, wherein the apparatus control information processing portion reads the stored apparatus control information and reproduces the apparatus control information along with the multimedia data in accordance with the title time.

9. The multimedia data reproducing apparatus according to claim 3, wherein the multimedia data acquiring portion acquires, through a network from an outside, at least one of an operating signal and sound source data for insertion, which are different from the operating signal and the sound source data for insertion associated with the acquired multimedia data.

10. The multimedia data reproducing apparatus according to claim 4, wherein the multimedia data acquiring portion acquires, through a network from an outside, at least one of an operating signal and sound source data for insertion, which are different from the operating signal and the sound source data for insertion associated with the acquired multimedia data.

11. The multimedia data reproducing apparatus according to claim 5, wherein the multimedia data acquiring portion acquires, through a network from an outside, apparatus control information for controlling the outside apparatus, which is different from the apparatus control information associated with the acquired multimedia data.

* * * * *